United States Patent [19]

Engdahl

[11] 4,314,455

[45] Feb. 9, 1982

[54] FREEZE CONCENTRATION APPARATUS AND PROCESS

[75] Inventor: Gerald E. Engdahl, Wheaton, Ill.

[73] Assignee: Chicago Bridge & Iron Company, Oak Brook, Ill.

[21] Appl. No.: 160,002

[22] Filed: Jun. 16, 1980

[51] Int. Cl.³ .............................................. B01D 9/04
[52] U.S. Cl. ...................................... 62/124; 62/542; 62/532
[58] Field of Search ................. 62/532, 542, 544, 123, 62/124

[56] References Cited

U.S. PATENT DOCUMENTS

| | | | |
|---|---|---|---|
| 3,073,131 | 1/1963 | Ashley | 62/542 |
| 3,410,923 | 11/1968 | Strand et al. | 62/532 |
| 3,501,924 | 3/1970 | Ashley | 62/542 |
| 3,628,344 | 12/1971 | King | 62/544 |

*Primary Examiner*—Norman Yudkoff

*Attorney, Agent, or Firm*—Merriam, Marshall & Bicknell

[57] ABSTRACT

A freeze concentration apparatus comprising a cold concentrator tank; a conduit to deliver an aqueous liquid mixture feed stream to the cold concentrator tank; a conduit to feed the liquid mixture from the cold concentrator tank to a freeze exchanger for indirect cooling by heat exchange to a cold fluid to form ice crystals in the liquid mixture; a conduit to feed the liquid mixture containing ice crystals from the freeze exchanger to the cold concentrator tank; a conduit to withdraw liquid mixture from the cold concentrator tank concentrated by the freezing of water therefrom; a conduit to withdraw an ice slurry from the cold concentrator tank and deliver it to an ice slurry washer; a spray system to wash the ice slurry in the washer with water a washer to collect washed ice and an aqueous mixture; a conduit to remove the aqueous mixture from the washer; and an unloader to remove the washed ice from the washer.

10 Claims, 3 Drawing Figures

FREEZE CONCENTRATION APPARATUS AND PROCESS

This invention relates to apparatus for, and methods of, concentrating a liquid mixture such as fruit and vegetable juices, seawater, brackish water, waste water, and chemical solutions and dispersions, by freezing a portion of the solvent, usually water.

BACKGROUND OF THE INVENTION

It is often necessary, or at least desirable, to concentrate a liquid mixture by removing a portion of the solvent, generally water, from the liquid mixture. The resulting product, therefore, is in a more concentrated form. It has been common to concentrate fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product; whereas, in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. Generally, reduced energy is required since freeze concentrating relies on the heat of fusion instead of the heat of evaporation. In such a process, water is removed by first producing ice crystals which are then separated from the concentrate. Next, the ice crystals are washed to remove the remaining concentrate on them. The ice crystals can then be discarded or melted if potable water is desired.

During the wash step, it is difficult to remove the concentrate completely from the ice crystals. When concentrating a product such as orange juice even a small loss of entrained concentrate is quite detrimental economically. See C. Judson King, "Separation Processes", McGraw-Hill, page 725. If the ice crystal size could be increased, removal of the entrained concentrate by washing would be more effective. Lowering the product viscosity would also facilitate washing.

Abraham Ogman's U.S. Pat. No. 4,091,635 discloses an apparatus and method of freeze concentrating an already concentrated feed stream. Ogman employs a two stage system in which each stage uses a freezer-crystallizer and a washer. In the first stage, the concentration is doubled. Ice from the first stage is then brought to the second stage and diluted with a feed stream of low concentration following which the diluted solution is freeze concentrated in the second stage.

In none of the previously disclosed freeze concentration systems presently known to applicant has the liquid mixture being concentrated been recirculated through a freeze exchanger until it reaches the desired concentration. Furthermore, no such recirculation system has been employed to produce ice crystals of relatively large size, and an ice slurry of low viscosity, which can be washed free of remaining concentrate with comparative ease.

SUMMARY OF THE INVENTION

One aspect of the invention provides a freeze concentration apparatus including a cold concentrator tank; a conduit to deliver an aqueous liquid mixture feed stream to the cold concentrator tank; a conduit to feed the liquid mixture from the cold concentrator tank to a freeze exchanger for indirect cooling of the liquid mixture by heat exchange to a cold fluid to form ice crystals in the liquid mixture; means to feed the liquid mixture containing ice crystals from the freeze exchanger to the cold concentrator tank; a conduit to withdraw liquid mixture from the cold concentrator tank after the freezing of water therefrom; means to withdraw an ice slurry from the cold concentrator tank and deliver it to an ice slurry washer; means to wash the ice slurry in the washer with water and to collect washed ice and an aqueous mixture; a conduit to remove the aqueous mixture from the washer; and means to remove the washed ice from the washer.

The conduit means to remove the aqueous mixture from the washer can include a conduit to deliver it to the cold concentrator. The apparatus can also include a washed ice melter; means to deliver the washed ice, removed from the washer, to the melter; and means to withdraw water from the melter.

To better utilize available cooling, the freeze concentration apparatus desirably includes a heat exchanger; conduit means to feed the aqueous liquid mixture feed stream through the heat exchanger and then to the cold concentrator tank; conduit means to feed concentrated liquid mixture, from the cold concentrator tank, through the heat exchanger countercurrent to flow therethrough of the feed stream; and conduit means to feed cold water from the melter through the heat exchanger countercurrent to flow therethrough of the feed stream.

To facilitate growth of the ice crystals and to reduce ice slurry viscosity, the freeze concentration apparatus comprises a warm concentrator tank; conduit means to deliver an aqueous liquid mixture feed stream to the warm concentrator tank; a cold concentrator tank; conduit means to deliver aqueous liquid mixture from the warm concentrator tank to the cold concentrator tank; conduit means to feed the liquid mixture from the cold concentrator tank to a primary freeze exchanger; indirectly cooling the liquid mixture in the primary freeze exchanger by heat exchange to a cold fluid to form ice crystals in the liquid mixture; means to feed the liquid mixture containing ice crystals from the primary freeze exchanger to the cold concentrator tank; conduit means to withdraw liquid mixture from the cold concentrator tank after the freezing of water therefrom; means to withdraw an ice slurry from the cold concentrator tank and deliver it to the warm concentrator tank; means to withdraw an ice slurry floating on the liquid mixture from the warm concentrator tank and deliver it to an ice slurry washer; means to wash the ice slurry in the washer with water and to collect washed ice and an aqueous mixture; conduit means to remove the aqueous mixture from the washer; and means to remove the washed ice from the washer.

A conduit means can be included to remove the aqueous mixture from the washer and deliver it to the warm concentrator. The apparatus can also include a washed ice melter; means to deliver the washed ice, removed from the washer, to the melter; and means to withdraw water from the melter.

A heat exchanger is desirably included with: a conduit means to feed the aqueous liquid mixture feed stream through the heat exchanger to the warm concentrator tank; and a conduit means to feed concentrated liquid mixture, from the cold concentrator tank, through the heat exchanger countercurrent to flow therethrough of the liquid mixture feed stream. A conduit means to feed cold water from the melter through the heat exchanger countercurrent to flow therethrough of the liquid mixture feed stream can also be included.

To control the liquid mixture temperature in the warm concentrator, and to aid in obtaining ice crystals of suitable size, the apparatus can incorporate: a secondary freeze exchanger; conduit means to feed liquid mixture from the warm concentrator tank to the secondary freeze exchanger for indirect cooling of the liquid mixture by heat exchange to a cold fluid to form ice crystals in the liquid mixture; and means to feed the liquid mixture containing ice crystals from the secondary freeze exchanger to the warm concentrator tank. In addition, a heater can be included in the warm concentrator tank to warm the liquid mixture therein if needed or desirable.

A second aspect of the invention provides a method of freeze concentrating an aqueous liquid mixture by feeding it to a cold concentrator tank; feeding the liquid mixture from the cold concentrator tank to a freeze exchanger for indirect cooling by heat exchange to a cold fluid to form ice crystals in the liquid mixture; feeding the liquid mixture containing ice crystals from the freeze exchanger to the cold concentrator tank; withdrawing liquid mixture from the cold concentrator tank after the freezing of water therefrom; withdrawing an ice slurry from the cold concentrator tank and delivering it to an ice slurry washer; washing the ice slurry in the washer with water and collecting washed ice and an aqueous mixture; removing the aqueous mixture from the washer; and removing the washed ice from the washer.

The method can also include removing the aqueous mixture from the washer and delivering it to the cold concentrator. The method can also be practiced by additionally delivering the washed ice, removed from the washer, to an ice melter and withdrawing water from the melter.

For efficient use of available cooling, the method can incorporate feeding the aqueous liquid mixture through a heat exchanger and then to the cold concentrator tank; feeding concentrated liquid mixture, from the cold concentrator tank, through the heat exchanger countercurrent to flow therethrough of the feed stream; and feeding cold water from the melter through the heat exchanger countercurrent to flow therethrough of the feed stream.

Crystal growth and reduced ice slurry viscosity are desirably achieved by incorporating a warm concentrate in the freeze concentration method. Also, more dilute solutions (warmer temperatures) initially produce larger crystals. Thus, the method includes feeding an aqueous liquid mixture to a warm concentrator tank; feeding an aqueous liquid mixture from the warm concentrator tank to a cold concentrator tank; feeding the liquid mixture from the warm concentrator tank to a primary freeze exchanger for indirect cooling by heat exchange to a cold fluid to form ice crystals in the liquid mixture; feeding the liquid mixture containing ice crystals from the primary freeze exchanger to the cold concentrator tank; withdrawing liquid mixture from the cold concentrator tank after the freezing of water therefrom; withdrawing an ice slurry from the cold concentrator tank and delivering it to the warm concentrator tank; withdrawing an ice slurry from the warm concentrator tank and delivering it to an ice slurry washer; washing the ice slurry in the washer with water and collecting washed ice and an aqueous mixture; removing the aqueous mixture from the washer; and removing the washed ice from the washer.

The method is low on energy consumption since it is based on the heat of fusion, rather than the latent heat of evaporation. Due to lower operating temperatures, it is also likely to be less corrosive than distillation processes in processing many liquid mixtures. The invention is considered adaptable in handling many different liquids and a wide range of feed stream concentrations. It is a simple system and does not require elaborate feed stream pretreatment. Scaling and fouling are minimized compared to evaporation systems. Flavor and aroma are better maintained in the concentrate than is the case with evaporative concentration methods.

The ice crystals formed in the process of the invention are of comparatively large size and are in a low viscosity solution. Thus, the crystals are readily handled and washed free of entrained concentrate. Melted ice leaving the process is, therefore, essentially free of concentrate. For a juice concentrator this means low product loss in the exit water. For a waste water concentrator this means a relatively pure product water stream.

An advantage of the described two stage process is that concentration is effected at the colder temperature and the ice is washed at the warmer temperature. This is clearly beneficial when juices are concentrated since ice from juices cannot be washed at the colder temperature.

DETAILED DESCRIPTION OF THE DRAWINGS

Figure 1:
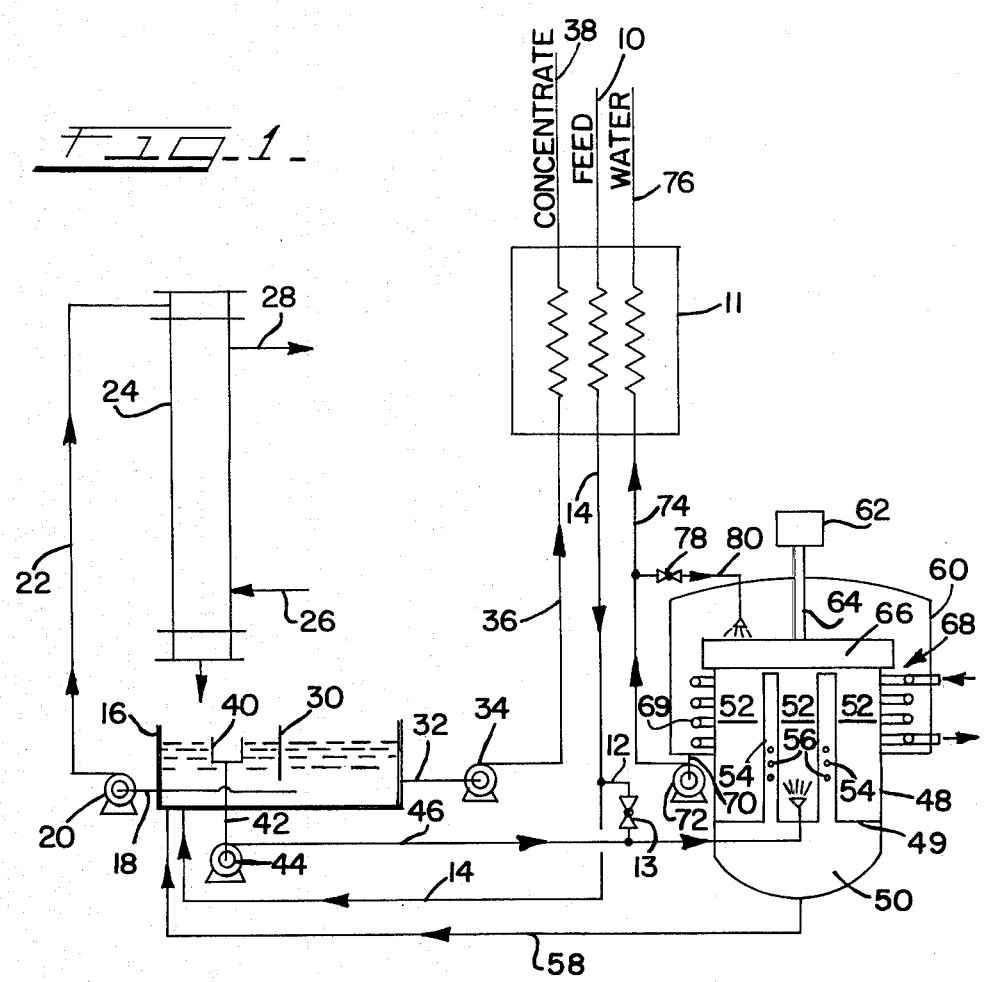
FIG. 1 is a schematic drawing of a freeze concentration apparatus provided by the invention using a cold concentrator tank.

With reference to FIG. 1, a liquid mixture feed stream is fed by conduit 10 to heat exchanger 11. The liquid mixture can be seawater, brackish water, orange juice, grapefruit juice, grape juice, tomato juice, a chemical solution or dispersion in water, a waste water, or some other aqueous liquid which is desirably concentrated. It is to be understood that sometimes the concentrate is the desired product, such as a fruit or vegetable juice. At other times the concentrate is discharged and the ice water is desired, as in producing potable water from seawater or brackish water.

The cooled liquid mixture exits from heat exchanger 11 to conduit 14 which delivers it to cold concentrator 16. The liquid is removed from the lower portion of cold concentrator 16 by conduit 18 which communicates with pump 20. The liquid contains a low ice fraction, but it has sufficient seed crystals to prevent excessive subcooling of the stream. Conduit 22 delivers the liquid from pump 20 to freeze exchanger 24 in which the liquid is cooled by indirect heat exchange with a cooling fluid circulated therethrough by inlet conduit 26 and outlet conduit 28. The cooling fluid can be a refrigerant such as ammonia or a Freon, or it can be a previously cooled liquid such as ethylene glycol or methanol. As the liquid mixture flows downwardly in freeze exchanger 24 its temperature is lowered sufficiently for ice to crystallize out. Both the ice fraction and crystal size will increase as the stream progresses through the freeze exchanger 24 and new ice crystals form. The ice-containing mixture flows out the bottom of freeze exchanger 24 into cold concentrator 16 which essentially operates at the freezing point of the desired final concentrate. The ice slurry may float on top of the liquid in cold concentrator 16. Even if it is not floating, there would be a higher concentration of ice crystals at the top of the slurry. Vertically positioned baffle 30 in cold concentrator 16 keeps the ice slurry isolated on one side thereof and this serves to prevent the ice from being withdrawn with concentrate by conduit 32. Conduit 32 communicates with pump 34 which, in turn, delivers the cold concentrate to conduit 36. The cold concentrate flows through heat exchanger 11 to conduit 38 which delivers it to a suitable destination.

Downcomer 40 is located in cold concentrator 16 at a level which permits ice slurry to spill over its edges into it so that the ice slurry can be withdrawn by conduit 42 which communicates with pump 44. The ice slurry is conveyed by conduit 46 from pump 44 to ice washer 48 in which the solution is separated from the slurry by gravity. A part of the feed stream optionally can be diverted from conduit 14 by conduit 12 and passed through valve 13 into conduit 46 to dilute the ice slurry and lower its viscosity if desirable.

Ice washer 48 has a horizontal divider 49 which separates it into a lower wash liquid receiving portion 50 and an upper ice receiving portion 52. A plurality of tubes 54 project upwardly from outlets in divider 49. Holes 56 in tubes 54 allow wash liquid to drain from the ice receiving portion 52, into tubes 54 and then to liquid receiving portion 50. Conduit 58 delivers wash liquid from liquid receiving portion 50, by gravity or use of a pump, to cold concentrator 16.

The upper part of ice washer 48 is surrounded by shell 60 which defines an ice slurry melter. Motor 62 is mounted above the top of shell 60. Shaft 64 extends from motor 62 to scraper blade 66 which rotates slowly. As the level of the upwardly moving porous bed slurry of ice crystals rises in ice washer 48 it contacts the rotating scraper blade 66 which pushes it out and over the edge of the ice washer into the ice melter 68 containing heating coils 69. A hot fluid is circulated through the heating coils to melt the ice and convert it to cold water. The heat required for melting the ice can be obtained from the freeze exchanger cooling system. For example, the melter could be used to condense a refrigerant circulated through the freeze exchanger 24. The cold water is removed from ice melter 68 by a conduit 70 which delivers it to pump 72. Conduit 74 conveys the cold water from pump 72 to heat exchanger 11 from which warm water is removed by conduit 76.

A stream of cold water is diverted from conduit 74 through valve 78 to conduit 80 from which water is sprayed onto the porous ice slurry in ice washer 48 to thoroughly wash the ice before it spills over into ice melter 68.

Figure 3:
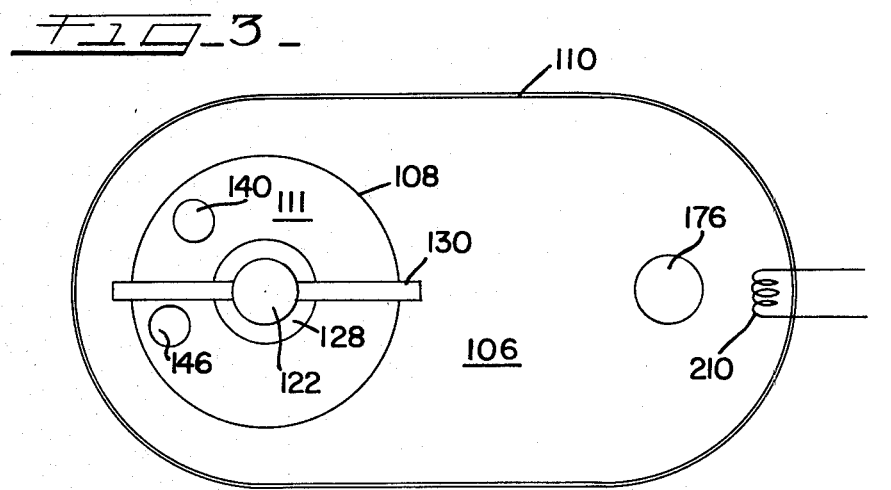
FIG. 3 is a plan view of the combination cold and warm concentrator tanks shown in FIG. 2.
Figure 2:
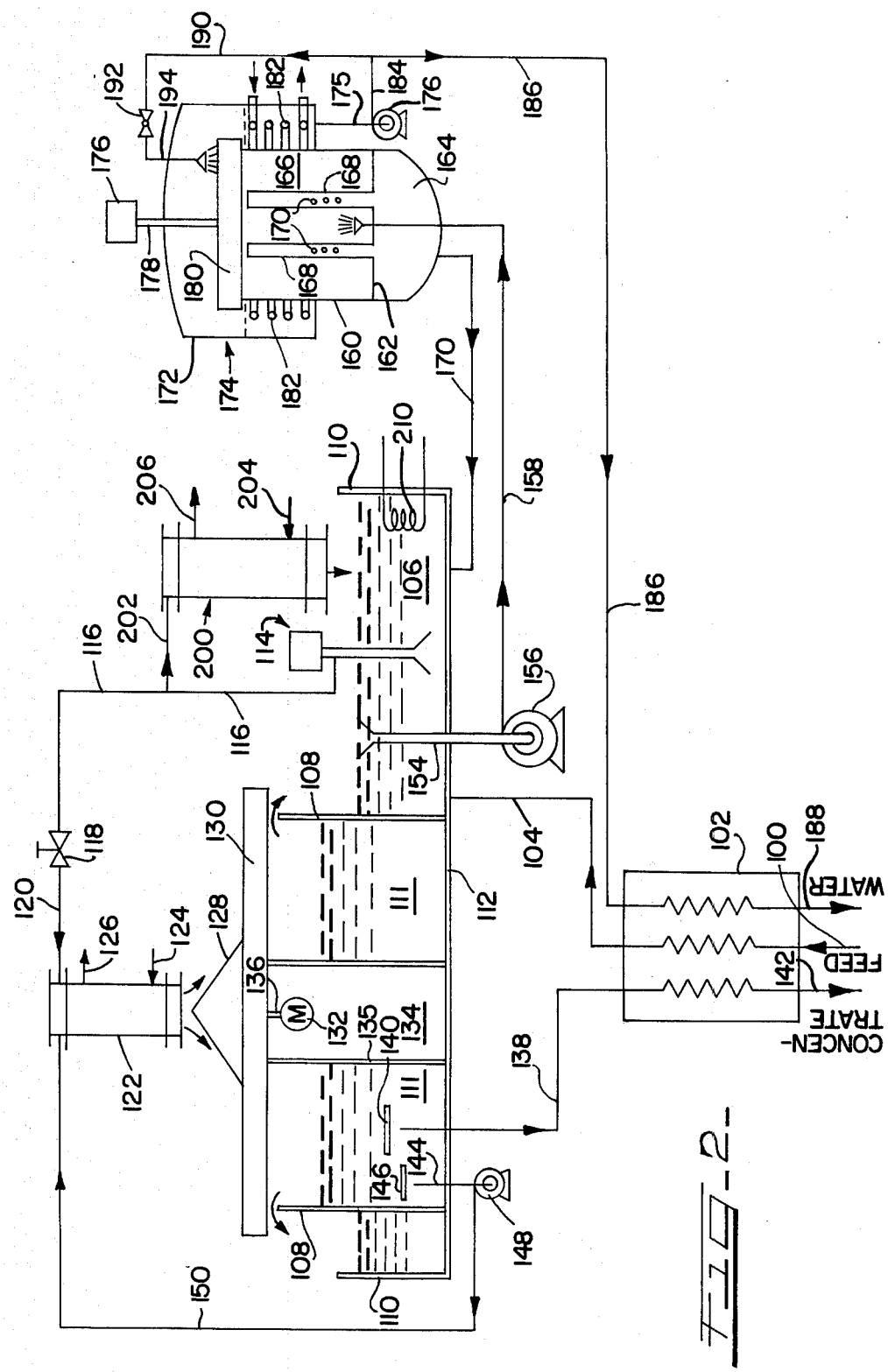
FIG. 2 is a schematic drawing of a freeze concentrator apparatus provided by the invention using a combination of cold and warm concentrator tanks.

FIGS. 2 and 3 illustrate a second embodiment of the invention in which staged cold and warm concentrators are used to obtain stepwise crystallization. It is particularly useful for higher product concentrations. The staged system increases crystal size and reduces the viscosity of the ice slurry going to the wash vessel. The washing is more effective when the crystals are larger and the viscosity is low. As shown in these figures, a liquid mixture feed stream is fed by conduit 100 to heat exchanger 102 from which a cold stream of the liquid mixture is delivered by conduit 104 to warm concentrator 106. The warm concentrator 106 is essentially the space between the inner vertical wall 108 and the outer vertical wall 110. The space surrounded by wall 108 defines a cold concentrator 111. Plate 112 forms the bottom of both concentrators.

A motor driven sump pump 114 delivers liquid from the warm concentrator 106 to conduit 116 which communicates with valve 118. Conduit 120 delivers the liquid from valve 118 to the top of freeze exchanger 122. The liquid mixture is indirectly cooled as it flows downwardly in freeze exchanger 122 by heat rejection to a circulating cooling fluid. The cooling fluid is introduced into the freeze exchanger by conduit 124 and is withdrawn therefrom by conduit 126. A refrigerant such as ammonia or a Freon gas, or ethylene glycol, can be used as the cooling fluid. If desired, some other cooling fluid which provides the necessary refrigeration can be employed.

As the downwardly flowing liquid mixture in freeze exchanger 122 is cooled, ice crystals form. The ice-containing liquid mixture flows out of the bottom of freeze exchanger 122 onto the top of conical distributor 128 which is supported by scraper blade 130. A motor 132 fits in dry well 134 defined by cylindrical wall 135 located in the center of the cold concentrator 111. Shaft 136 extends from motor 132 to scraper blade 130 to drive the same.

An ice slurry forms in cold concentrator 111 and it floats on top of a cold concentrator liquid mixture therein. Liquid concentrate is removed from the cold concentrator 111 by conduit 138, having an inlet beneath baffle 140 so as to prevent ice slurry from entering the inlet. Conduit 138 conducts the cold liquid concentrate to heat exchanger 102. The warmed liquid concentrate is withdrawn from heat exchanger 102 by conduit 142 and delivered to a destination for disposal or further processing as is appropriate.

A liquid mixture stream also can be removed from cold concentrator 111 by conduit 144 having an inlet beneath baffle 146 so as to prevent ice particles from entering. Conduit 144 delivers the liquid to pump 148 which communicates with conduit 150. Conduit 150 delivers the liquid to the upper part of freeze exchanger 122 in which it is cooled to form ice. The liquid containing ice crystals then flows out the bottom of the freeze exchanger back into the cold concentrator 111.

As ice slurry builds up in cold concentrator 111, it contacts rotating scraper blade 130 which pushes it over the top edge of wall 108 into warm concentrator 106 which contains warm liquid mixture, thereby diluting the ice slurry, lowering its viscosity and promoting growth of the ice crystals which facilitates subsequent handling and washing.

The open mouth of downcomer conduit 154 receives ice slurry from warm concentrator 106 and delivers it to pump 156 which feeds it to conduit 158. Conduit 158 delivers the ice slurry to ice washer 160. Ice washer 160 has a horizontal divider 162 which separates it into a lower wash liquid receiving portion 164 and an upper ice receiving portion 166. A plurality of tubes 168 project upwardly from outlets in divider 162. Holes 170 in tubes 168 allow wash water to drain from the ice receiving portion 166, into tubes 168 and then to liquid receiving portion 164. Conduit 170 delivers wash liquid from liquid receiving portion 164 to warm concentrator 106.

The upper part of ice washer 160 is surrounded by shell 172 which defines an ice melter 174. Motor 176 is mounted above the top of shell 172. Shaft 178 extends from motor 176 to scraper blade 180 which rotates slowly. As the level of the ice slurry rises in ice washer 160 it contacts the rotating scraper blade 180 which pushes it out and over the edge of the ice washer into the ice melter 174 containing heating coils 182. A hot fluid is circulated through the heating coils to melt the ice and convert it to cold water. The cold water is removed from ice melter 174 by a conduit 175 which delivers it to pump 176. Conduit 184 conveys the cold water from pump 176 to conduit 186 which feeds the cold water to heat exchanger 102. The warmed water is withdrawn from heat exchanger 102 by conduit 188.

A stream of cold water is diverted from conduit 184 to conduit 190, through valve 192, to conduit 194 from which water is sprayed onto the ice slurry in ice washer 160 to thoroughly wash the ice before it spills over into ice melter 174.

Occasionally, it may be desirable or necessary to cool the liquid in the warm concentrator 106 so a secondary freeze concentrator 200 may be provided for this purpose. A stream of the liquid mixture can be diverted from conduit 116 by conduit 202 and be fed into the upper portion of freeze concentrator 200 where it can be cooled indirectly by heat exchange to a cooling fluid circulated therethrough. The cooling fluid, such as a refrigerant like ammonia or a Freon gas, can be supplied by conduit 204 to freeze exchanger 200 and be withdrawn therefrom by conduit 206. Ice crystallizes from the liquid mixture as it flows downwardly in freeze exchanger 200. The ice-containing liquid mixture flows out of the bottom of freeze exchanger 200 into warm concentrator 106.

At times it may be appropriate to raise the temperature of the warm concentrator contents. For that purpose there is provided a heating coil 210, which may be an electric resistance coil or a hot fluid heating coil.

The foregoing detailed description has been given for clearness of understanding only. No unnecessary limitations should be understood therefrom, as modifications will be obvious to those skilled in the art.

What is claimed is:

1. A freeze concentration apparatus comprising:
   a cold concentrator tank having upper and lower portions;
   a conduit means to deliver an aqueous liquid mixture feed stream to the cold concentrator tank;
   means to feed the liquid mixture from the cold concentrator tank to a freeze exchanger for indirect cooling by heat exchange to a cold fluid to form ice crystals in the liquid mixture;
   means to feed the liquid mixture containing ice crystals from the freeze exchanger to the cold concentrator tank to separate an ice slurry in the cold concentrator tank upper portion on top of liquid mixture;
   conduit means to withdraw liquid mixture from the cold concentrator tank lower portion concentrated by the freezing of water therefrom;
   means to withdraw an ice slurry from the cold concentrator tank upper portion and deliver it to an ice slurry washer;
   means to wash the ice slurry in the washer with water and to collect washed ice and an aqueous mixture;
   conduit means to remove the aqueous mixture from the washer; and
   means to remove the washed ice from the washer.

2. A freeze concentration apparatus according to claim 1 in which:
   the conduit means to remove the aqueous mixture from the washer includes means to deliver it to the cold concentrator tank.

3. A freeze concentration apparatus according to claim 1 including:
   a washed ice melter;
   means to deliver the washed ice, removed from the washer, to the melter; and
   means to withdraw water from the melter.

4. A freeze concentration apparatus comprising:
   a cold concentrator tank having upper and lower portions;
   a conduit means to deliver an aqueous liquid mixture feed stream to the cold concentrator tank;
   means to feed the liquid mixture from the cold concentrator tank to a freeze exchanger for indirect cooling by heat exchange to a cold fluid to form ice crystals in the liquid mixture;
   means to feed the liquid mixture containing ice crystals from the freeze exchanger to the cold concentrator tank to separate an ice slurry in the cold concentrator tank upper portion on top of liquid mixture;
   conduit means to withdraw liquid mixture from the cold concentrator tank lower portion concentrated by the freezing of water therefrom;
   means to withdraw an ice slurry from the cold concentrator tank upper portion and deliver it to an ice slurry washer;
   means to wash the ice slurry in the washer with water and collect washed ice and an aqueous mixture;
   conduit means to remove the aqueous mixture from the washer and deliver it to the cold concentrator tank;
   a washed ice melter;
   means to remove the washed ice from the washer and deliver it to the melter; and
   means to withdraw cold water from the melter.

5. A freeze concentration apparatus according to claim 4 comprising:
   a heat exchanger;
   conduit means to feed the aqueous liquid mixture feed stream through the heat exchanger and then to the cold concentrator tank;
   conduit means to feed concentrated liquid mixture, from the cold concentrator tank, through the heat exchanger countercurrent to flow therethrough of the feed stream; and
   conduit means to feed cold water from the melter through the heat exchanger countercurrent to flow therethrough of the feed stream.

6. A method of freeze concentrating an aqueous liquid mixture comprising:
   feeding an aqueous liquid mixture feed stream to a cold concentrator tank having upper and lower portions;
   feeding the liquid mixture from the cold concentrator tank lower portion to a freeze exchanger for indirect cooling by heat exchange to a cold fluid to form ice crystals in the liquid mixture;
   feeding the liquid mixture containing ice crystals from the freeze exchanger to the cold concentrator tank;
   withdrawing liquid mixture from the cold concentrator tank lower portion concentrated by the freezing of water therefrom;
   withdrawing an ice slurry from the cold concentrator tank upper portion and delivering it to an ice slurry washer;
   washing the ice slurry in the washer with water and collecting washed ice and an aqueous mixture;
   removing the aqueous mixture from the washer; and
   removing the washed ice from the washer.

7. A method according to claim 6 including:
   removing the aqueous mixture from the washer and delivering it to the cold concentrator.

8. A method according to claim 6 including:
   delivering the washed ice, removed from the washer, to an ice melter; and
   withdrawing water from the melter.

9. A method comprising:
   delivering an aqueous liquid mixture feed stream to a cold concentrator tank having upper and lower portions;
   feeding the liquid mixture from the cold concentrator tank lower portion to a freeze exchanger for indirect cooling by heat exchange to a cold fluid to form ice crystals in the liquid mixture;
   feeding the liquid mixture containing ice crystals from the freeze exchanger to the cold concentrator tank;
   withdrawing liquid mixture from the cold concentrator tank lower portion concentrated by the freezing of water therefrom;
   withdrawing an ice slurry from the cold concentrator tank upper portion and delivering it to an ice slurry washer;
   washing the ice slurry in the ice slurry washer with water and collecting washed ice and an aqueous mixture;
   removing the aqueous mixture from the ice slurry washer and delivering it to the cold concentrator tank;
   removing the washed ice from the washer and delivering it to the melter; and
   withdrawing cold water from the melter.

10. A method according to claim 9 including:
    feeding the aqueous liquid mixture feed stream through a heat exchanger and then to the cold concentrator tank;
    feeding concentrated liquid mixture, from the cold concentrator tank, through the heat exchanger countercurrent to flow therethrough of the feed stream; and
    feeding cold water from the melter through the heat exchanger countercurrent to flow therethrough of the feed stream.

* * * * *